United States Patent [19]

Ludwig

[11] 4,253,946
[45] Mar. 3, 1981

[54] CLEANING ATTACHMENT FOR GRAIN AUGERS

[76] Inventor: Louis Ludwig, Box 219, Lampman, Saskatchewan, Canada

[21] Appl. No.: 49,467

[22] Filed: Jun. 18, 1979

[30] Foreign Application Priority Data

May 29, 1979 [CA] Canada .................................. 328887

[51] Int. Cl.³ .............................................. B07B 1/20
[52] U.S. Cl. .................................... 209/283; 209/241; 209/247; 138/106
[58] Field of Search ............... 209/240, 241, 247, 274, 209/278, 281, 283; 198/657, 671, 861, 860; 138/172, DIG. 5, 106; 285/114

[56] References Cited

U.S. PATENT DOCUMENTS

| | | | |
|---|---|---|---|
| 2,598,470 | 5/1952 | Vutz .................... | 198/860 X |
| 3,249,220 | 5/1966 | Bakke ................... | 209/283 X |
| 3,588,858 | 6/1971 | Christianson .......... | 209/283 X |
| 3,679,046 | 7/1972 | Loch et al. ........... | 209/283 X |

Primary Examiner—Ralph J. Hill
Attorney, Agent, or Firm—Stanley G. Ade

[57] ABSTRACT

A series of semi-circular cut-out portions are provided on the underside of an auger tube which are covered with blanks when the cleaning device is not in use, but which are covered with semi-circular sieves when it is desired to clean grain or the like being augered. The mesh of the screens is selected to suit the cleaning desired. A shroud encloses the sieves and an auxiliary auger is situated at the base of the shroud and is driven by the main auger drive. This auxiliary or return auger moves wheat seeds and the like which have passed through the sieve, to a discharge at the lower end of the shroud regardless of the angle of inclination of the main auger assembly. Reinforcing means are provided on the upper side of the main auger tube (tension) and upon the lower side thereof (compression) in order that distortion and/or damage will occur to the main auger tube particularly during transportation of the auger assembly from one place to another.

19 Claims, 7 Drawing Figures

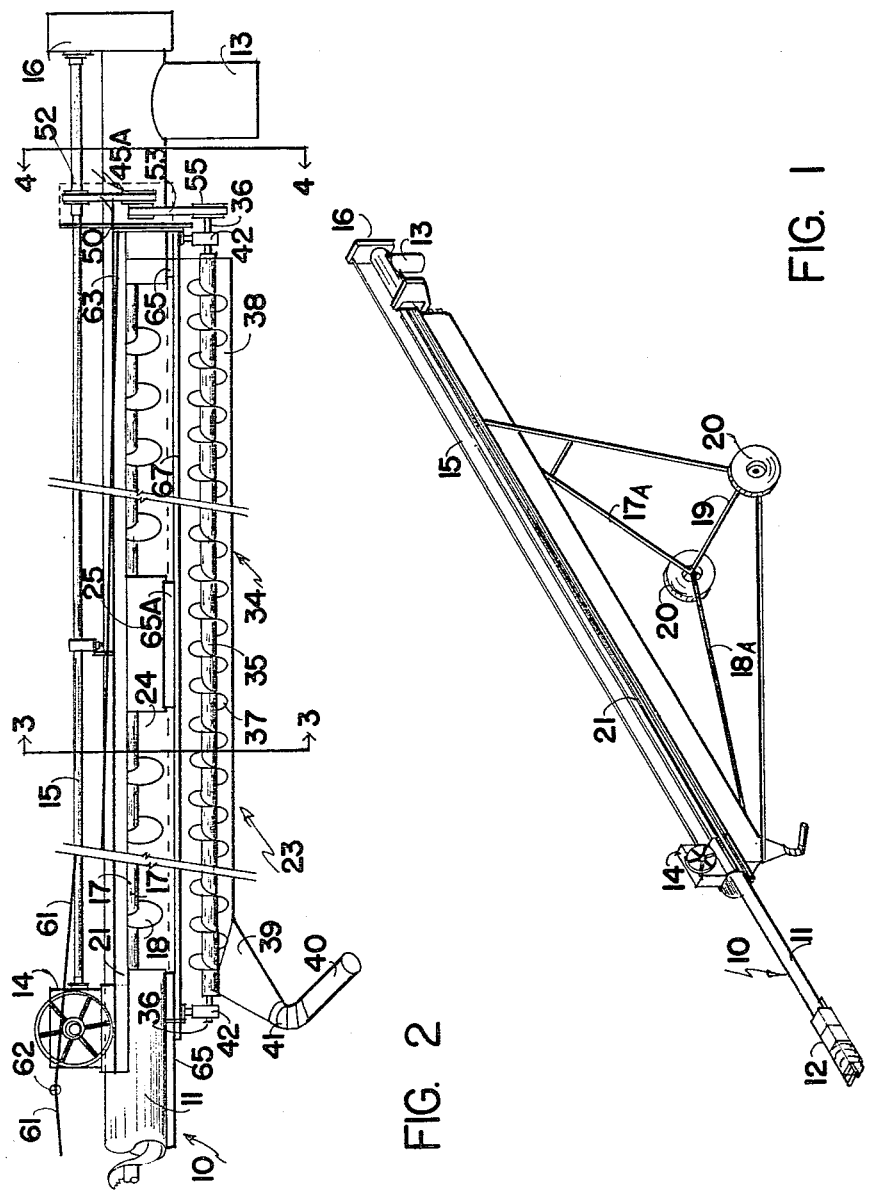

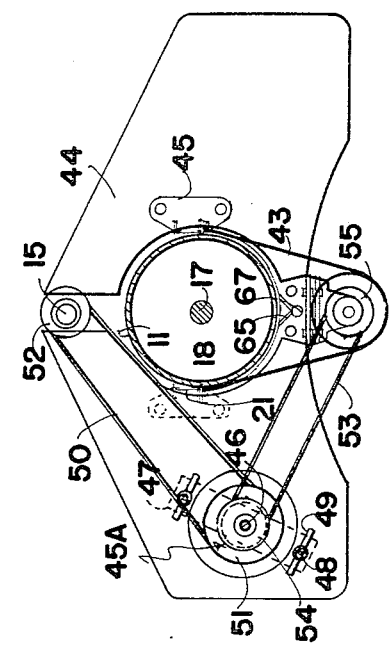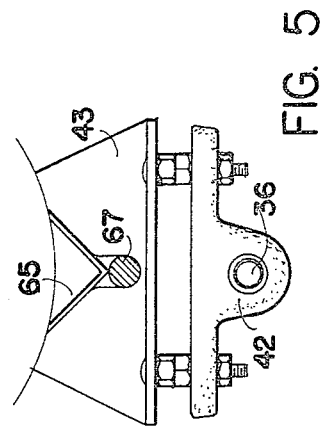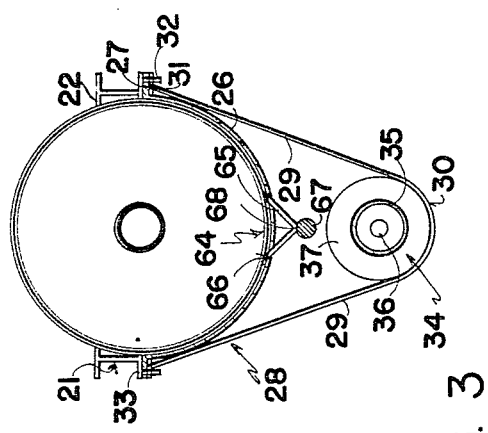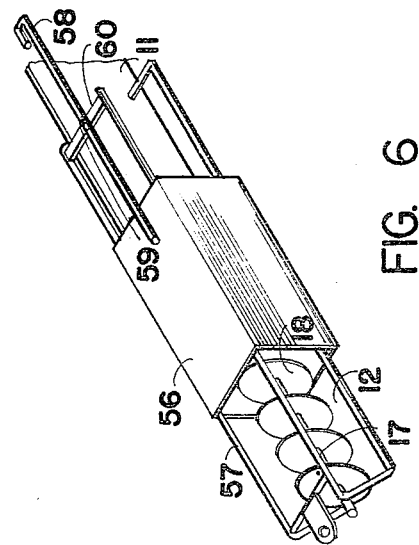

CLEANING ATTACHMENT FOR GRAIN AUGERS

BACKGROUND OF THE INVENTION

This invention relates to new and useful improvements in cleaning devices associated with conventional grain auger assemblies.

Heretofore, such grain auger assemblies normally consist of add-on features which necessitate the remodelling and restructuring of an existing auger assembly and examples of such assembles are shown in U.S. Pat. Nos. 2,706,046 and 3,409,119.

Also of interest are Canadian Pat. Nos. 925,041 and 727,987.

In all these cases, several disadvantages are present. Firstly and perhaps most importantly is the fact that the main auger tube is severely weakened by the provision of apertures in the base thereof so that it is virtually impossible to transport the auger assembly from one place to another by towing same behind a truck or the like because, due to the excessive length of conventional grain auger assemblies, distortion and/or breakage often occurs.

Secondly, these cleaning devices rely on gravity to move the material passing through the sieve, to a lower discharge so that they are not effective in use when the auger is being operated at a relatively shallow angle as is often the case.

Thirdly, none of these devices show a controlled intake for the main auger assembly so that the volume and speed of the material passing over the screens can be controlled in order to obtain the most efficient cleaning of this material.

SUMMARY OF THE INVENTION

The present invention overcomes these disadvantages and in accordance with the invention there is provided in an auger assembly which includes an elongated auger tube and an auger shaft and flight rotatable therein and having an intake end and a discharge end and means to drive said shaft and flight; a cleaning assembly for said auger assembly, said cleaning assembly comprising in combination at least one longitudinally extending aperture formed in the under side of the auger tube, a sieve component enclosing said opening, a shroud enclosing said sieve component and an auxiliary auger shaft and flight journalled for rotation within said shroud to move material in said shroud towards one end thereof, discharge means at said one end of said shroud and means to drive said auxiliary auger shaft.

Another advantage of the invention is to provide a device of the character herewithin described which consists of a grain auger assembly comprising in combination an elongated auger tube, an auger shaft and flight journalled for rotation within said tube, means to rotate said shaft and flight within said tube, an intake end adjacent one end of said tube and a discharge means at the other end of said tube, a cleaning assembly for said auger assembly, said cleaning assembly including at least one longitudinally extending aperture formed in the under side of said auger tube, a sieve component enclosing said aperture, a shroud enclosing said sieve component and an auxiliary auger shaft and flight journalled for rotation within said shroud to move material in said shroud towards one end thereof, discharge means at said one end of said shroud and means to drive said auxiliary auger shaft.

A further advantage of the invention is the provision of the auxiliary auger within the shroud below the sieve components which permits the material passing through said components into the shroud, to be moved to the discharge end of the shroud so that it does not act as a block to further cleaning of sieving action.

Yet another advantage of the present invention is to provide a device of the character herewithin described which is particularly suitable for use with a relatively long auger assembly and which furthermore may include means whereby the clean-out portion thereof may be disabled so that the auger assembly can be used as a conventional conveyor.

Yet another advantage of the invention is to provide a device of the character herewithin described which is simple in construction, economical in operation and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a partially schematic isometric view of the invention.

FIG. 2 is a side elevation of the main auger assembly with the cleaning assembly shown in partial section.

FIG. 3 is a section along the line 3—3 of FIG. 2.

FIG. 4 is a section along the line 4—4 of FIG. 2.

FIG. 5 is a fragmentary end elevation of the auxiliary auger mounting per se.

FIG. 6 is a fragmentary isometric view of the intake end of the main auger showing the flow control.

FIG. 7 is an end view of one of the curved blank sheets or plates per se.

In the drawings like characters of reference indicate corresponding parts in the different figures.

DETAILED DESCRIPTION

Proceeding therefore to describe the invention in detail, reference should first be made to FIG. 1 which shows a conventional grain auger assembly collectively designated 10 and which may take any conventional form. It is provided with an elongated auger tube 11 having an intake end 12 at one end thereof and a discharge means 13 at the other end thereof.

A source of power (not illustrated) is connected to a gear box 14 mounted upon the upper side of the tube 11 and a drive shaft 15 extends from the gear box, to a further box 16 adjacent the discharge end which is operatively connected to an auger shaft 17 having an auger flight 18 secured therearound. This auger shaft and flight are journalled for rotation at either end of the auger tube and rotate within the auger tube to move material such as grain, from the intake end, and discharge same through the discharge means 13.

Conventionally, the auger assembly is mounted on adjustable support members 17A and 18A which in turn connect to an axle 19 carrying ground engaging wheels 20 upon either end thereof. All of this structure is conventional and it is not believed necessary to describe same further except to say that, in this particular embodiment, a pair of longitudinally extending reinforcing channel members 21 are secured along either side of the auger tube 11 as by welding and are braced to the tube by flanges 22 as clearly shown in FIG. 3. These outwardly facing channel members 21 are used to mount the ends of the support members 17 and 18 and to permit adjustment therebetween so that the elevation of the auger assembly may be adjusted as is conventional.

A cleaning assembly is provided collectively designated 23 and secured to the underside of the main auger tube 11.

A plurality of portions of the underside of the tube 11 are cut away leaving semi-cylindrical openings 24 separated by the underside curved portions of the auger tube which have not been removed, as indicated by reference character 25.

Semi-cylindrical screen elements or components 26 are provided with outwardly turned longitudinally extending flanges 27 on the edges thereof and each of these sieve components 26 covers or encloses the semicircular cut-out portion 24 with the radius of the sieve components being similar to the radius of the auger tube 11 as clearly illustrated in FIG. 3.

A shroud collectively designated 28 in turn encloses the full length of the sieve components and portions 25 and this shroud includes a pair of downwardly and inwardly sloping side panels 29 having a substantially arcuately curved base or trough portion 30 formed at the lower ends thereof. Outwardly turned flanges 31 are formed on the upper edges of the sides 29 and are detachably secured by nut and bolt assemblies 32, to the lower flanges 33 of the aforementioned longitudinally extending channels 21 with the flanged portions 27 of the sieve components 26 being clamped between the flanges 31 and the flanges 33, once again as clearly shown in FIG. 3.

An auxiliary auger assembly collectively designated 34 consists of a steel pipe core shaft 35 with stub shafts 36 centered within the pipe 35 and secured thereto and extending one from each end thereof. An auger flight 37 is secured around the pipe or tube 35 and the radius of this auger flight is substantially similar to the radius of the trough portion 30 as clearly shown in FIG. 3. The main auger flight 18 is adapted to auger material in one direction. Namely from the intake end 12 to the discharge 13 whereas the auger flight 37 is of the opposite hand and augers material from one end 38 thereof adjacent the discharge 13 towards a discharge funnel 39 which is adjacent the gear box 14 in this particular embodiment. A discharge conduit 40 is connected to funnel 39 by a flexible connection 41.

Means are provided to journal the tube or pipe 35 for rotation within the shroud 28, said means taking the form of a pillow block assembly 42 situated externally of each end of the shroud 28 and being secured to a bracket 43 which in turn is secured to the underside of the main auger tube 11 as shown in FIG. 5. The stub shafts 36 are journalled for rotation within the pillow block bearings 42 and means are provided to rotate this auxiliary auger assembly 34. A sheet metal frame 44 is secured by brackets 45 to the main auger tube 11 at the rear or upper ends of the channels 21 and a double V pulley 45A is journalled for rotation upon a spindle 46 which in turn is carried by a bracket 47 adjustably secured within the sheet metal frame 44 on one side thereof. This securement is by adjustable nut and bolt assemblies 48 extending through the bracket 48 and through arcuate slots 49 within the frame 44.

A drive belt 50 extends around the larger of the double pulleys identified by reference character 51 and around a drive pulley 52 secured to the main drive shaft 15. A further V belt 53 extends around the smaller of the pulleys of the double pulley specifically designated 54 and around a pulley 55 secured to the stub shaft 36 at the rear or upper end of the auxiliary auger assembly 34.

This supplies the necessary drive to the auxiliary auger assembly at approximately one-quarter the speed of the main auger shaft 17.

In operation, the screens 26 are secured around the openings or cut-outs 24 with a mesh of sufficient size to sieve or clean the material being augered by the main auger assembly. Material that passes through the screens is collected within the shroud 29 and is in turn augered from the shroud through the discharge 40.

If it is desired to use the main auger assembly as a conveyor only, then semi-circularly curved blank sheets 26A, similar in configuration to screens 26, are situated around the semi-circular openings or cut-outs 24 thus blanking same off and making the auxiliary auger assembly inoperative.

It is desirable to control the speed and volume of the material being augered by the main auger assembly 10 and in this connection reference should be made to FIG. 6 which shows a three-sided casing 56 slidably engaged over the bars 57 constituting the intake of the main auger assembly and slidable along these bars by means of a control rod 58 secured to the upper portion of the casing and running within a small sleeve bearing 59 situated on a cross member 60 at the rear end of the intake portion. By sliding this casing 56 along the bars 57, the volume of intake is varied so that the volume of material passing over the screens 26 is varied.

The longitudinally extending channel members 21 not only support the screens and shroud 26 and 28, but also assist in stiffening the main auger tube 11 which is weakened by the cut-out portions 24. The shroud 28 is also preferably formed from a relatively heavy gauge material and also assists in stiffening this auger tube.

However, for transporting the auger assembly by towing same behind a vehicle, still further reinforcement is required in order to prevent distortion and/or breakage occurring and in this regard, reference should be made first to FIG. 1.

Tension rods 61 are anchored by the ends thereof adjacent each end of the auger tube and upon the upper side thereof inclining upwardly and inwardly from the ends towards the gear box 14 which includes an anchor 62 to support the inner ends of these tension rods spaced above the auger tube. Turnbuckles shown schematically by reference character 63 are provided in each of the rods 61 so that tension can be applied thereto thus giving support on the upper surface of the auger tube 11. This is referred to as a tension brace assembly in some of the claims.

Compression brace means collectively designated 64 are provided along the underside of the tube 11, said means taking the form of an angle member 65 secured in a V configuration along the underside of the tube 11 and centrally of the underside as clearly shown in FIG. 3 with the upper edges 66 being welded to the tube as clearly shown.

This angle member extends along all portions of the tube which are not part of the cut-out portions 24 and as an example, a section of this angle member is shown in FIG. 2 and indicated by reference character 65A.

A rod 67 is in turn welded to the apex 68 of the V-shaped angle member and runs the full length of the sieve areas extending clear across these cut-out portions 24 as clearly shown in FIG. 2. This supplies a compression brace for the underside of the tube thus giving the additional stiffness or rigidity to the tube which is required at this point. This prevents any folding or jack-knifing during transit which might result as a result of the weakened tube caused by the cut-outs 24.

The device hereinbefore described is preferably incorporated with the auger assembly during construction thereof and provides a plurality of relatively long sieve components which are interchangeable and can be supplied in different meshes for different needs.

The auger return by means of the auxiliary auger assembly 34, returns the screenings regardless of the angle of inclination of the auger assembly thereby eliminating the gravity flow required by conventional sieve components.

Although it is designed primarily for use with grains, nevertheless it will be appreciated that it can be used for other comminuted materials that require screening and cleaning.

Insofar as grain is concerned, the sieves can be adjusted as to mesh to screen out wheat seeds, cracked grain, relatively small seeds from large seeds such as rapeseed from wheat and the like, volunteer seeds which are usually smaller than the seed being augered, to give a few examples.

These screenings are of considerable value for animal or poultry feed and the like as well as reducing dockage at the elevator when the cleaned seed is sold.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an auger assembly which includes an elongated auger tube and an auger shaft and flight rotatable therein and having an intake end and a discharge end and means to drive said shaft and flight; a cleaning assembly for said auger assembly, said cleaning assembly comprising in combination at least one longitudinally extending aperture formed in the under side of the auger tube, a sieve component enclosing said opening, a shroud enclosing said sieve component and an auxiliary auger shaft and flight journalled for rotation within said shroud to move material in said shroud towards one end thereof, discharge means at said one end of said shroud, means to drive said auxiliary auger shaft, a tension brace assembly for said tube extending from adjacent one end thereof to adjacent the other end thereof and compression brace means secured along the under side of said tube, said compression brace means including an angle member secured by the side edges of the side flanges thereof, to the underside of said tube and a brace rod secured to said angle member along the junction of said side flanges thereof.

2. The assembly according to claim 1 which includes a blank plate selectively engageable over said opening in place of said sieve component when said cleaning assembly is inoperative.

3. The assembly according to claim 1 which includes a plurality of apertures formed along the under side of said auger tube in spaced apart relationship and a detachable sieve for each aperture, each of said sieves being substantially semi-circular in cross sectional configuration and completing the circumference of said auger tube and having an attaching flange along each side edge thereof.

4. The assembly according to claim 3 in which said shroud includes downwardly and inwardly sloping longitudinally extending sides, longitudinally extending attaching flanges along the upper edges of said sides and a longitudinally extending arcuately curved base portion, the radius of said base portion being similar to the radius of said auxiliary auger flight, said flanges of said sieve component being engaged by said flanges of said shroud.

5. The assembly according to claim 3 which includes an arcuately curved blank plate for each of said apertures selectively engaging over said apertures in place of said sieve component when said cleaning assembly is inoperative.

6. The assembly according to claim 1 in which said shroud includes downwardly and inwardly sloping longitudinally extending sides, longitudinally extending attaching flanges along the upper edges of said sides and a longitudinally extending arcuately curved base portion, the radius of said base portion being similar to the radius of said auxiliary auger flight.

7. The assembly according to claim 6 which includes a blank plate selectively engageable over said opening in place of said sieve component when said cleaning assembly is inoperative.

8. The assembly according to claim 7 which includes an arcuately curved blank plate for each of said apertures selectively engaging over said apertures in place of said sieve component when said cleaning assembly is inoperative.

9. A grain auger assembly comprising in combination an elongated auger tube, an auger shaft and flight journalled for rotation within said tube, means to rotate said shaft and flight within said tube, an intake end adjacent one end of said tube and a discharge means at the other end of said tube, a cleaning assembly for said auger assembly, said cleaning assembly including at least one longitudinally extending aperture formed in the under side of said auger tube, a sieve component enclosing said aperture, a shroud enclosing said sieve component and an auxiliary auger shaft and flight journalled for rotation within said shroud to move material in said shroud towards one end thereof, discharge means at said one end of said shroud, means to drive said auxiliary auger shaft, a tension brace assembly for said tube extending from adjacent one end thereof to adjacent the other end thereof and compression brace means secured along the under side of said tube, said compression brace means including an angle member secured by the side edges of the side flanges thereof, to the underside of said tube and a brace rod secured to said angle member along the junction of said side flanges thereof.

10. The assembly according to claim 9 which includes a pair of reinforcing members on said tube one upon each side edges of said openings, said shroud being detachably secured to said reinforcing members by the side edges of said shroud.

11. The assembly according to claim 9 in which said shroud includes downwardly and inwardly sloping longitudinally extending sides, longitudinally extending attaching flanges along the upper edges of said sides and a longitudinally extending arcuately curved base portion, the radius of said base portion being similar to the radius of said auxiliary auger flight.

12. The assembly according to claim 11 which includes a pair of reinforcing members on said tube one upon each side edge of said openings, said shroud being detachably secured to said reinforcing members by the side edges of said shroud.

13. The assembly according to claim 9 which includes a plurality of apertures formed along the under side of said auger tube in spaced apart relationship and a detachable sieve for each aperture, each of said sieves being substantially semi-circular in cross sectional configuration and completing the circumference of said auger tube and having an attaching flange along each side edge thereof.

14. The assembly according to claim 3 in which said shroud includes downwardly and inwardly sloping longitudinally extending sides, longitudinally extending attaching flanges along the upper edges of said sides and a longitudinally extending arcuately curved base portion, the radius of said base portion being similar to the radius of said auxiliary auger flight.

15. The assembly according to claim 14 which includes a pair of reinforcing members on said tube one upon each side edge of said openings, said shroud being detachably secured to said reinforcing members by the side edges of said shroud.

16. The assembly according to claim 3 which includes a pair of reinforcing members on said tube one upon each side edges of said openings, said shroud being detachably secured to said reinforcing members by the side edges of said shroud.

17. The assembly according to claims 9, 10 or 11 which includes an adjustable intake means at said intake end of said auger assembly to vary the volume and speed over said sieve, of material being augered by said auger assembly.

18. The assembly according to claims 12, 13 or 14 which includes an adjustable intake means at said intake end of said auger assembly to vary the volume and speed over said sieve, of material being augered by said auger assembly.

19. The assembly according to claims 15 or 16 which includes an adjustable intake means at said intake end of said auger assembly to vary the volume and speed over said sieve, of material being augered by said auger assembly.

* * * * *